Jan. 2, 1945.　　　S. OESTREICHER ET AL　　　2,366,548
ARC-TIME RECORDER
Filed June 26, 1943
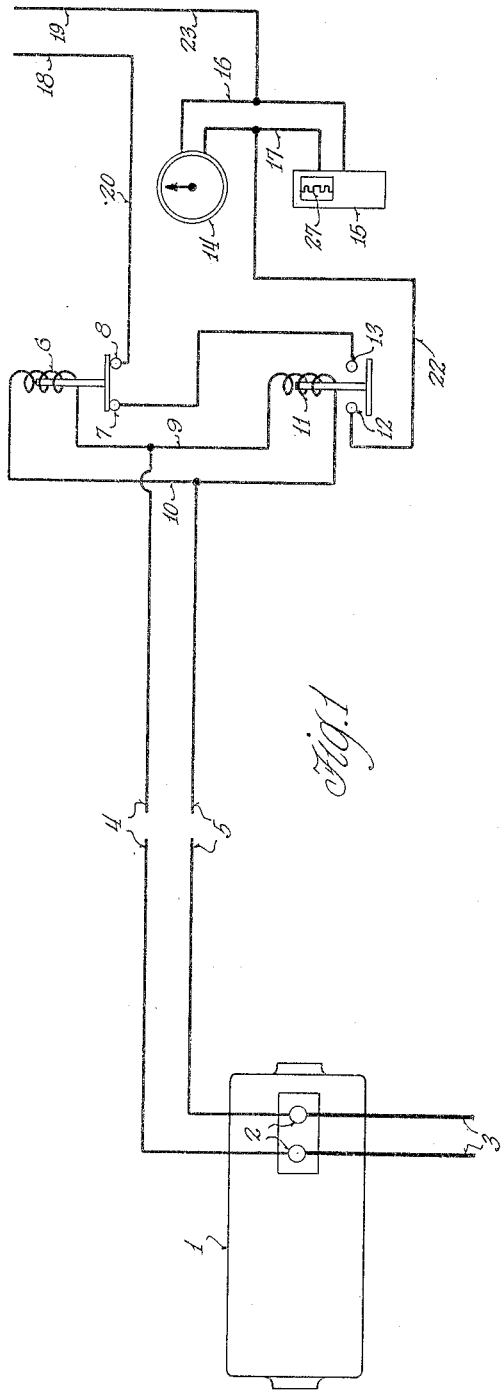
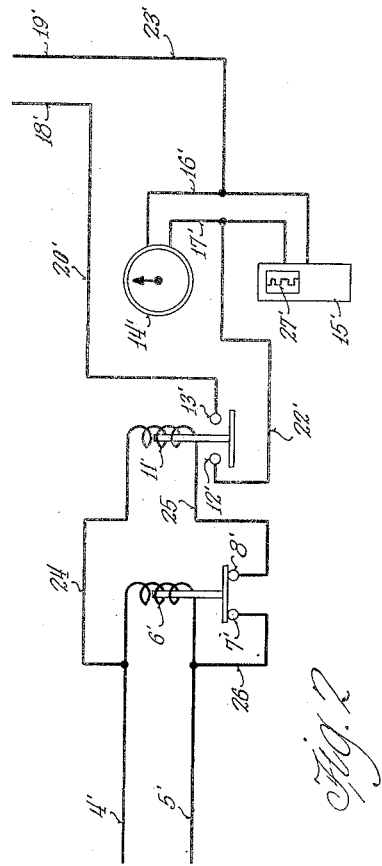
INVENTORS
Sol Oestreicher
Erwin C. Brekelbaum
BY David A. Fox
ATTORNEY Patented Jan. 2, 1945

2,366,548

UNITED STATES PATENT OFFICE 2,366,548

ARC-TIME RECORDER

Sol Oestreicher and Erwin C. Brekelbaum, Milwaukee, Wis., assignors to Harnischfeger Corporation, Milwaukee, Wis., a corporation of Wisconsin Application June 26, 1943, Serial No. 492,656

2 Claims. (Cl. 161—15)

This invention relates to apparatus for recording the time during which a source of arc welding current is delivering an output suitable for welding purposes and resides in an improved form of such apparatus, which does not require passage of the heavy welding current through any part of the recording apparatus, thus permitting the entire recording apparatus to be positioned at a location remote from the source of welding current to which it need be connected by light leads only.

In the operation of production facilities in which arc welding apparatus is employed, particularly where a multiplicity of welders is functioning simultaneously, excessive clerical work has been required to maintain reasonable records for computation of costs and for determination of the compensation to which the individual welder is entitled. Efforts to simplify this problem by adoption of piece work methods of compensation have failed because hasty and imperfect workmanship toward which such a system trends should be avoided in any case, and particularly so in an operation such as welding. On the other hand, compensation based purely on time devoted to the work does nothing to encourage the industrious operator, unless adjustments are made in the time rate of compensation of individual operators. In a large operation it is difficult to do this with such impartiality that it will not defeat its own ends.

By means of this invention an automatic continuous record of actual time devoted to welding by each operator may be graphically made, or a totalization of the time devoted to welding by each operator may be made, or both may be made simultaneously. Such a graphic record permits of detailed time studies of various operations with little or no clerical work devoted to accumulation of time study data, while the totalized time furnishes an entirely impartial measure of operator output upon which a true incentive system of compensation may be based. The operator further is encouraged to perform the work in a thorough and workmanlike manner, and he is not penalized by circumstances beyond his control, such as poor fits in the work which require extra welding.

In order that apparatus for this purpose be entirely satisfactory, it should be simple and reliable, capable of ready installation on present equipment, and capable of being housed in its entirety in a location away from the work so that it will not be damaged, and so that the temptation for tampering is removed. Furthermore, such apparatus should be capable of reliably recording all of each actual welding operation, and also capable of discriminating the same from casually or deliberately imposed loads which are not of welding character. It is the object of this invention to fulfill these requirements.

In the accompanying drawing forming a part hereof, specific forms of circuits embodying this invention are set forth by way of illustration and not of limitation, and in the same Fig. 1 is a diagram showing one form of the circuit of this invention, and Fig. 2 is a diagram showing a variation in the circuit arrangement of this invention.

Referring now to Fig. 1, a circuit in accordance with this invention is shown in relationship to a typical source of welding current designated by the numeral 1. The source of welding current may be either a conventional welding motor-generator for supplying direct current, or the usual transformer or the like for furnishing alternating welding current. From the source terminals 2, conventional heavy welding leads 3, shown in fragmentary form only, extend to the work to be welded.

Also connected to the source terminals 2, are light leads 4 and 5 which extend from the source 1 to the recording and discriminating parts of the circuit, which may be located in a remote position with respect to the source and separately housed if desired.

The discriminating parts of the circuit, as shown in Fig. 1, are made up of a normally closed voltage responsive relay 6, which, for example, when energized by a voltage in excess of 50 to 55 volts moves to open a circuit between contacts 7 and 8, and which when the energizing voltage falls to 45 to 40 volts, moves to reclose the circuit between contacts 7 and 8. The coil of the relay 6 is connected by leads 9 and 10 respectively, to light leads 4 and 5. The relay 6 will hereinafter at times be referred to as the open circuit or no-load cutout relay.

In addition to the relay 6, the discriminating parts of the circuit include a normally open voltage responsive relay 11, which, for example, when energized by a voltage in excess of 17 to 20 volts, moves to close a circuit between contacts 12 and 13, and which when the energizing voltage falls to below 10 to 12 volts, moves to open the circuit between contacts 12 and 13. The coil of the relay 11 is likewise connected by the leads 9 and 10 to the light leads 4 and 5, as shown. The relay 11 will hereinafter at times be referred to as the short circuit cutout.

The recording parts of the circuit comprise a synchronous motor-driven time-recorder or electric clock 14, and if desired a graphic recorder 15, connected in parallel by the leads 16 and 17. The clock 14 and recorder 15 are of well known conventional construction and therefore, are not described in detail since such details form no part of this invention. It will be sufficient for those skilled in the art to point out that the graphic recorder 15, is an instrument having a clock driven paper chart engaged by a scribing number, which moves a predetermined distance transversely of the direction of movement of the chart when energizing current is applied through the leads 16 and 17. Such instruments are commonly provided with multiple scribing members through corresponding multiple terminal connections, but for simplicity only a single scribing number is indicated.

A suitable source of ordinary commercial, controlled-frequency alternating current is provided through leads 18 and 19. Line lead 18 is connected by lead 20 to contact 8, while contact 7 is connected by lead 21 to contact 13. Contact 12 in turn is connected by lead 22 to lead 17. Lead 16 is connected by lead 23 to power lead 19 forming the other side of the alternating current supply. In this way current is supplied to the recording parts of the circuit under the control of the discriminating parts of the circuit.

In operation, in a typical sequence, the circuit shown in Fig. 1, responds first and before welding current is drawn through leads 3 by opening of the normally closed no-load relay 6, and as long as this condition prevails no current may pass from leads 18 and 19 to the totalizer 14 or the recorder 15. At the same time the potential of the welding current source 1 is effective to close the short circuit relay 11 in preparation for the response required when welding current is drawn. As soon as the operator starts to weld, the potential of the source 1 drops substantially and relay 6, being properly adjusted therefor, drops its armature and bridges and closes contacts 7 and 8. As soon as this occurs the totalizer 14 starts to move and the scribing mechanism of recorder 15 moves to cause a displacement in the line 27 drawn thereby. This condition prevails as long as welding current is drawn, but if the arc is interrupted relay 6 opens under the increased no-load potential of the source 1, thus stopping the movement of the totalizer 14 and returning the scriber of recorder 15 to its base line position.

In the event that the operator attempts to maintain the totalizer 14 and recorder 15 in operation without actually welding, simply by short circuiting the source 1, draw a heavy current therethrough, then relay 11 comes into action. This results from the fact that relay 11 is adjusted to drop its armature whenever the applied potential falls below that delivered by the source 1 at the largest possible rate of current consumption by an actual welding operation. In this way temptation to the operator to subject the equipment to an injurious condition for the sake of creating a fictitious record is removed.

In view of the fact that relays 6 and 11 are intended to be responsive to potential variations, they are wound for high resistance in the case where a direct current source 1 is employed, or for high impedance in case the source 1 be an alternating current source. By reason of this a relatively small current flows in the leads 4 and 5 and they may be made of comparatively small wire, even though they are of considerable length without materially influencing the response of the apparatus. In this way the discriminating and recording apparatus may be conveniently housed in a suitable location, remote from the area where the welding is carried on so that accidental damage and tampering may be minimized.

In Fig. 2, is shown another variation of the circuit of this invention in which leads 4' and 5' lead from the terminals of a welding current source not shown, and in a manner similar to that shown in Fig. 1. The leads 4' and 5' join with the coil of a normally closed, no-load relay 6' adjusted to be responsive only to voltages in excess of those prevailing under welding conditions. Also joined to lead 4' by lead 24 is one end of the coil of a normally closed short circuit relay 11'. The other end of the coil of relay 11' is joined by a lead 25 to one contact 8' of relay 6', and thence through the other contact 7' of said relay, when closed, by means of lead 26, to electrical connection with lead 5'.

The short circuit relay 11' is provided with contacts 12' and 13' which serve as the final stage of the discriminating part of the circuit to control a recording and totalizing circuit, which is a counterpart of that shown in Fig. 1. To this end, supply leads 18' and 19' furnishing ordinary commercial, controlled-frequency alternating current are provided. Supply lead 18' is connected through lead 20' and contacts 13' and 12' of relay 11', when closed, with lead 22' which joins electrically with lead 17'; while supply lead 19' is joined directly through lead 23' with lead 16'. Leads 16' and 17' are joined both to the time clock or totalizer 14', and to the recorder 15' in the manner and for the purposes explained in connection with the corresponding circuit elements shown in Fig. 1.

The form of the circuit of this invention shown in Fig. 2 has the advantage that the relay 11' is never subjected to voltages in excess of a maximum welding voltage which is somewhat less than the no-load voltage output of the usual welding source. Because of this the problem of design of the relay 11' is somewhat simplified as compared with the problem involved in the case of relay 11 shown in Fig. 1. The relay 11 of Fig. 1 must be capable of withstanding continuous application of a potential, say for example, of 90 volts, and nevertheless still function to open at voltages of, say 12 to 20 volts. On the other hand, and under comparable conditions, the relay 11' is not called upon to withstand a steady voltage in excess of, say 55 volts.

By means of either of the circuits of Fig. 1 or 2, it is possible to obtain an impartial and accurate record of the performance of a welding operator, on the basis of which such things as incentive compensation may be computed, or time study analysis may be made. Depending, of course, upon the nature of the information desired, either the totalized record or the graphic record may be dispensed with.

We claim:

1. In a time-totalizing apparatus adapted for totalizing intermittent time intervals during which voltage within a predetermined range is prevailing in an electric load circuit the combination comprising, a recording circuit adapted for connection with a source of controlled frequency alternating current, a synchronous motor-driven electric clock contained in said recording circuit and adapted to be driven when said recording circuit is energized, switch means in said recording circuit for controlling the energization thereof, a discriminating circuit adapted for connection with said load circuit for response to voltage variations therein, and electromagnetic actuating means contained in said discriminating circuit cooperatively associated with said switch means contained in said recording circuit and adapted to actuate said switch means to maintain said recording circuit energized only when voltage prevailing in said load circuit is maintained within a predetermined range.

2. In a time-totalizing apparatus adapted for totalizing intermittent time intervals during which voltage within a predetermined range is prevailing in an electric load circuit the combination comprising, a recording circuit adapted for connection with a source of controlled frequency alternating current, a synchronous motor-driven electric clock contained in said recording circuit and adapted to be driven when said recording circuit is energized, a normally-open switch in said recording circuit for controlling the energization thereof, an electro-magnetic actuator adapted to close said normally-open switch only when voltage is applied thereto in excess of a predetermined minimum, a normally-closed switch adapted to control admission of energizing current to said electro-magnetic actuator, a second electro-magnetic actuator adapted to open said normally-closed switch only when voltage is applied thereto in excess of a predetermined minimum greater than said first-named predetermined minimum, and discriminating circuit connections adapted for connecting said load circuit to said second-named electro-magnetic actautor and thru the normally-closed switch controlled thereby to said first-named electro-magnetic actuator.

SOL OESTREICHER.
ERWIN C. BREKELBAUM.